(12) United States Patent
Saito

(10) Patent No.: US 11,037,273 B2
(45) Date of Patent: Jun. 15, 2021

(54) NOISE PROCESSING APPARATUS AND NOISE PROCESSING METHOD

(71) Applicant: FUJIFILM Corporation, Tokyo (JP)

(72) Inventor: Taro Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 27 days.

(21) Appl. No.: 16/435,088

(22) Filed: Jun. 7, 2019

(65) Prior Publication Data

US 2019/0295225 A1    Sep. 26, 2019

Related U.S. Application Data

(63) Continuation of application No. PCT/JP2017/039535, filed on Nov. 1, 2017.

(30) Foreign Application Priority Data

Jan. 10, 2017 (JP) .............................. JP2017-001917

(51) Int. Cl.
  *G06T 5/00* (2006.01)
  *G06T 3/40* (2006.01)
  *H04N 1/409* (2006.01)

(52) U.S. Cl.
  CPC ............ *G06T 5/002* (2013.01); *G06T 3/4084* (2013.01); *G06T 5/00* (2013.01); *H04N 1/409* (2013.01); *G06T 2207/20182* (2013.01)

(58) Field of Classification Search
  None
  See application file for complete search history.

(56) References Cited

U.S. PATENT DOCUMENTS

| 6,757,395 B1 * | 6/2004 | Fang ................... G10L 21/0208 381/94.3 |
| 2004/0184648 A1 * | 9/2004 | Zhang ..................... G06T 7/586 382/141 |

(Continued)

FOREIGN PATENT DOCUMENTS

| JP | 2005-196270 A | 7/2005 |
| JP | 2007-28348 A | 2/2007 |

(Continued)

OTHER PUBLICATIONS

Image Denoising Using Multiresolution Analysis and Nonlinear Filtering. Malini et al (Year: 2015).*

(Continued)

*Primary Examiner* — Delomia L Gilliard
(74) *Attorney, Agent, or Firm* — Birch, Stewart, Kolasch & Birch, LLP

(57) ABSTRACT

A noise processing apparatus and a noise processing method capable of increasing cost-performance in the case of performing a noise reducing process for each band using a multiresolution transform and adding a desired noise are provided. The noise processing apparatus includes a multiresolution transform unit (32) that generates a plurality of band images in different resolutions by performing a multiresolution transform process including image size reduction on an original image, a noise reducing unit (34) that performs a noise reducing process on the band image, and a reverse multiresolution transform unit (38) that generates an output image in the same resolution as the original image by performing a reverse multiresolution transform process including image size expansion and a noise addition process on the band image subjected to the noise reducing process, the reverse multiresolution transform unit (38) performing (Continued)

the noise addition process in a lower resolution than the original image.

9 Claims, 11 Drawing Sheets

(56) References Cited

U.S. PATENT DOCUMENTS

| | | | |
|---|---|---|---|
| 2005/0141778 A1 | 6/2005 | Nakajima et al. | |
| 2005/0213849 A1* | 9/2005 | Kreang-Arekul | G06T 5/008 382/284 |
| 2008/0292194 A1* | 11/2008 | Schmidt | G06T 7/11 382/217 |
| 2010/0183222 A1* | 7/2010 | Fattal | G06T 5/10 382/166 |
| 2011/0052095 A1* | 3/2011 | Deever | H04N 5/2173 382/300 |
| 2011/0216210 A1* | 9/2011 | Hao | H04N 5/23248 348/222.1 |
| 2011/0268328 A1 | 11/2011 | Bar-Aviv et al. | |
| 2014/0226902 A1* | 8/2014 | Yamaguchi | H04N 5/23229 382/167 |

FOREIGN PATENT DOCUMENTS

| | | |
|---|---|---|
| JP | 2012-23708 A | 2/2012 |
| JP | 2012-513816 A | 6/2012 |

OTHER PUBLICATIONS

Band-Specific Shearlet-Based Hyperspectral Image Noise Reduction . Karami et al. (Year: 2015).*
International Preliminary Report on Patentability and English translation of the Written Opinion of the International Searching Authority (Forms PCT/IB/326, PCT/IB/373, and PCT/ISA/237) for International Application No. PCT/JP2017/039535, dated Jul. 25, 2019.
International Search Report (Form PCT/ISA/210) for International Application No. PCT/JP2017/039535, dated Jan. 30, 2018, with English translation.

* cited by examiner

NOISE PROCESSING APPARATUS AND NOISE PROCESSING METHOD

CROSS-REFERENCE TO RELATED APPLICATIONS

The present application is a Continuation of PCT International Application No. PCT/JP2017/039535 filed on Nov. 1, 2017 claiming priority under 35 U.S.C. § 119(a) to Japanese Patent Application No. 2017-001917 filed on Jan. 10, 2017. Each of the above applications is hereby expressly incorporated by reference, in their entirety, into the present application.

BACKGROUND OF THE INVENTION

1. Field of the Invention

The present invention relates to a noise processing technology for images.

2. Description of the Related Art

In the related art, a technology for performing a noise reducing process for each band using a multiresolution transform has been known as a noise processing technology for images.

In the disclosure of JP2005-196270A, a plurality of band images in different resolutions are generated by performing a multiresolution transform process including image size reduction on an original image. Signal intensity adjustment of attenuating the amount of change in signal intensity is performed on a pixel at which the amount of change in signal intensity is less than or equal to a specific threshold in a range of a flesh color in the band image. A reverse multiresolution transform process including image size expansion is performed on the band image subjected to the signal intensity adjustment. Accordingly, a color image of the same resolution as the original image in which a wrinkle or a spot in the range of the flesh color is removed is generated. In addition, in the disclosure of JP2005-196270A, an image having no visual imbalance is made by further adding a weak noise signal to the range of the flesh color in the processed color image.

In the disclosure of JP2007-028348A, the original image is separated into a low-frequency component image and a high-frequency component image. A noise is removed from only the high-frequency component image, and a random monochromatic noise is added to a region of the high-frequency component image except for an edge pixel. The low-frequency component image on which the noise removal and the noise addition are not performed is composited with the high-frequency component image on which the noise removal and the noise addition are performed.

SUMMARY OF THE INVENTION

It may be desirable to add the noise addition function as an optional function to the configuration in which the noise reducing process is performed for each band using the multiresolution transform.

In JP2005-196270A, performing the noise addition process on the range of the flesh color in the processed image is disclosed, but performing the noise addition process before the reverse multiresolution transform process or in the middle of the reverse multiresolution transform process is not disclosed. The noise addition process is considered to be performed in the same resolution as the original image after the reverse multiresolution transform process.

In the case of adding the noise addition function as an optional function, it is necessary to add a module dedicated for the noise addition process in reality in a case where the configuration in which the noise addition process is performed after the reverse multiresolution transform process is used. That is, in the case of adding the noise addition function as an optional function not used by all users, cost-performance is apparently low.

In JP2007-028348A, separating the original image into the low-frequency component image and the high-frequency component image and performing the noise removal process and the noise addition process on only the high-frequency component image are disclosed, but performing the noise addition process in a lower resolution than the original image is not disclosed.

An object of the present invention is to provide a noise processing apparatus and a noise processing method capable of increasing cost-performance in the case of performing a noise reducing process for each band using a multiresolution transform and adding a desired noise.

In order to achieve the object, a noise processing apparatus according to a first aspect of the present invention comprises a multiresolution transform unit that generates a plurality of band images in different resolutions by performing a multiresolution transform process including image size reduction on an original image, a noise reducing unit that performs a noise reducing process on the band image, and a reverse multiresolution transform unit that generates an output image in the same resolution as the original image by performing a reverse multiresolution transform process including image size expansion and a noise addition process on the band image subjected to the noise reducing process, the reverse multiresolution transform unit performing the noise addition process in a lower resolution than the original image.

According to the present aspect, the noise addition process is performed in a lower resolution than the original image in a configuration in which the noise reducing process is performed for each band using the multiresolution transform. Thus, a noise expanded in size can be formed in the output image using an element for the reverse multiresolution transform process. Cost-performance can be increased in a case where it is desirable to add the noise addition function as an optional function.

In the noise processing apparatus according to a second aspect of the present invention, the reverse multiresolution transform unit performs the noise addition process before the image size expansion in the reverse multiresolution transform process. According to the present aspect, by performing the noise addition process before the image size expansion in the reverse multiresolution transform process, implementation can be made at a low cost in a case where it is desirable to add a function enabling addition of noises of various sizes as an optional function.

In the noise processing apparatus according to a third aspect of the present invention, the reverse multiresolution transform unit performs the noise addition process in parallel in two or more resolutions.

The noise processing apparatus according to a fourth aspect of the present invention further comprises a noise size adjusting unit that switches between adding and not adding a noise for each resolution in the noise addition process. According to the present aspect, it is not necessary to always form a noise of the maximum size in the output image.

The noise processing apparatus according to a fifth aspect of the present invention further comprises a gain processing unit that adjusts an intensity of a noise by multiplying the noise to be added by a gain. In the present aspect, the gain processing unit can perform both of the noise intensity adjustment and the noise size adjustment.

In the noise processing apparatus according to a sixth aspect of the present invention, the gain processing unit adjusts the intensity of the noise by multiplying the noise by the gain different for each resolution.

The noise processing apparatus according to a seventh aspect of the present invention further comprises a region determination unit that determines at least a first brightness region and a second brightness region having a higher brightness than the first brightness region in the original image, and a gain control unit that sets the gain to be different depending on the first brightness region and the second brightness region.

In the noise processing apparatus according to an eighth aspect of the present invention, in a case where the original image is a positive image, the gain control unit sets the gain of the noise to be added to a pixel corresponding to the second brightness region to be smaller than the gain of the noise to be added to a pixel corresponding to the first brightness region, and in a case where the original image is a negative image, the gain control unit sets the gain of the noise to be added to the pixel corresponding to the second brightness region to be greater than the gain of the noise to be added to the pixel corresponding to the first brightness region.

A noise processing method according to a ninth aspect of the present invention comprises generating a plurality of band images in different resolutions by performing a multiresolution transform process including image size reduction on an original image, performing a noise reducing process on the band image, and generating an output image in the same resolution as the original image by performing a reverse multiresolution transform process including image size expansion and performing a noise addition process in a lower resolution than the original image on the band image subjected to the noise reducing process.

According to the present invention, cost-performance can be increased in the case of performing a noise reducing process for each band using a multiresolution transform and adding a desired noise.

DESCRIPTION OF THE PREFERRED EMBODIMENTS

Hereinafter, an embodiment of a noise processing apparatus and a noise processing method according to the present invention will be described in accordance with the appended drawings.

Figure 1:
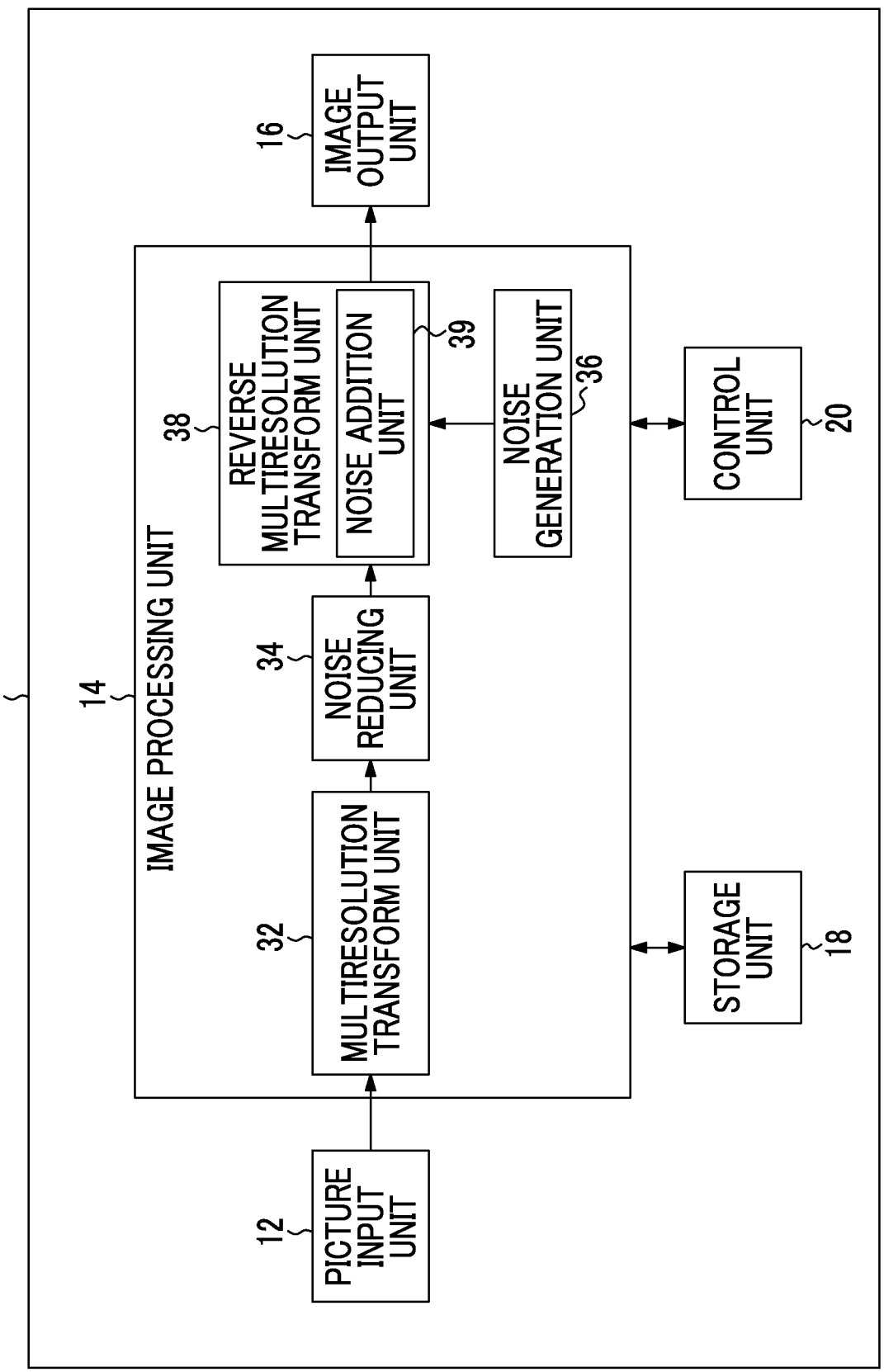
FIG. 1 is a block diagram illustrating a configuration example of a noise processing apparatus according to an embodiment of the present invention.

FIG. 1 is a block diagram illustrating a configuration example of the noise processing apparatus according to the embodiment of the present invention.

A noise processing apparatus 10 of the present example is configured to include a picture input unit 12 inputting an original image, an image processing unit 14 performing various image processing including noise processing on the original image input by the picture input unit 12, an image output unit 16 outputting the image subjected to the image processing by the image processing unit 14, a storage unit 18 storing a program and information necessary for executing the program, and a control unit 20 controlling each unit of the noise processing apparatus 10 in accordance with the program stored in the storage unit 18. The picture input unit 12 can be configured with an input device that inputs the original image as digital data. For example, the image processing unit 14 can be configured with a hardware circuit or a central processing unit (CPU), or a combination of the hardware circuit and the CPU. The image output unit 16 can be configured with an output device that outputs the image subjected to the image processing as digital data. The storage unit 18 can be configured with a transitory storage device and a non-transitory storage device. The program is stored in the non-transitory storage device. The control unit 20 can be configured with a CPU.

The image processing unit 14 of the present example includes a multiresolution transform unit 32 generating a plurality of band images in different resolutions by performing a multiresolution transform process including image size reduction on the original image, a noise reducing unit 34 performing a noise reducing process on each of the plurality of band images, a noise generation unit 36 generating a noise, and a reverse multiresolution transform unit 38 generating an output image in the same resolution as the original image by performing a reverse multiresolution transform process including image size expansion and a noise addition process on the plurality of band images subjected to the noise reducing process. The reverse multiresolution transform unit 38 of the present example includes a noise addition unit 39 that adds the noise generated by the noise generation unit 36 to an image that is any of the band image subjected to the noise reducing process and an image (hereinafter, referred to as an "in-processing image") in the middle of the reverse multiresolution transform process and is in a lower resolution than the original image. In the present example, the multiresolution transform unit 32, the noise reducing unit 34, the noise generation unit 36, and the reverse multiresolution transform unit 38 are controlled by the control unit 20. In order to increase the speed of the image processing, the whole image processing unit 14 may be configured with a hardware circuit. Alternatively, a part of the image processing unit 14 may be configured with a hardware circuit. In addition, the noise generation unit 36 may be disposed outside the image processing unit 14.

Figure 2:
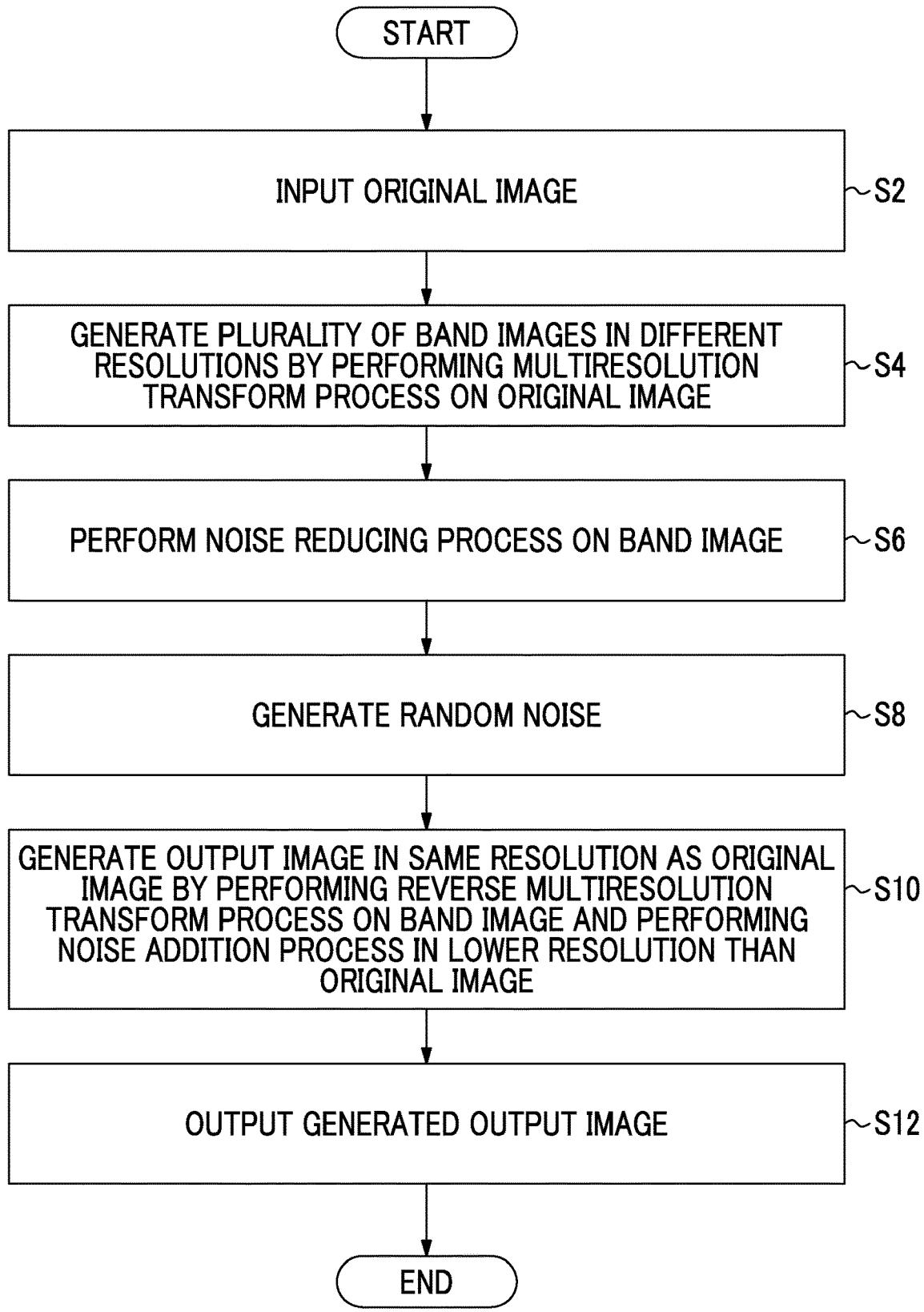
FIG. 2 is a flowchart illustrating a flow of noise processing example to which a noise processing method according to the embodiment of the present invention is applied.

FIG. 2 is a flowchart illustrating a flow of noise processing example to which the noise processing method according to the embodiment of the present invention is applied. The noise processing of the present example is executed by the control unit 20 in accordance with the program stored in the storage unit 18.

First, the picture input unit 12 inputs the original image (step S2).

Next, the multiresolution transform unit 32 generates a plurality of band images in different resolutions by performing the multiresolution transform process including the image size reduction on the original image (step S4). The original image is a two-dimensional (an x direction and a y direction are present) image. The multiresolution transform unit 32 of the present example reduces the image size in both directions of the x direction and the y direction.

Next, the noise reducing unit 34 performs the noise reducing process on each of the plurality of band images (step S6).

In addition, the noise generation unit 36 generates a random noise (step S8).

Next, the reverse multiresolution transform unit 38 generates an output image in the same resolution as the original image by performing the reverse multiresolution transform process including the image size expansion and performing the noise addition process in a lower resolution than the original image on the band image subjected to the noise reducing process (step S10). The reverse multiresolution transform unit 38 of the present example expands the image size in both directions of the x direction and the y direction. In addition, the reverse multiresolution transform unit 38 of the present example can expand the size of the noise in both directions of the x direction and the y direction.

The image output unit 16 outputs the generated output image (step S12).

First Example

Figure 3:
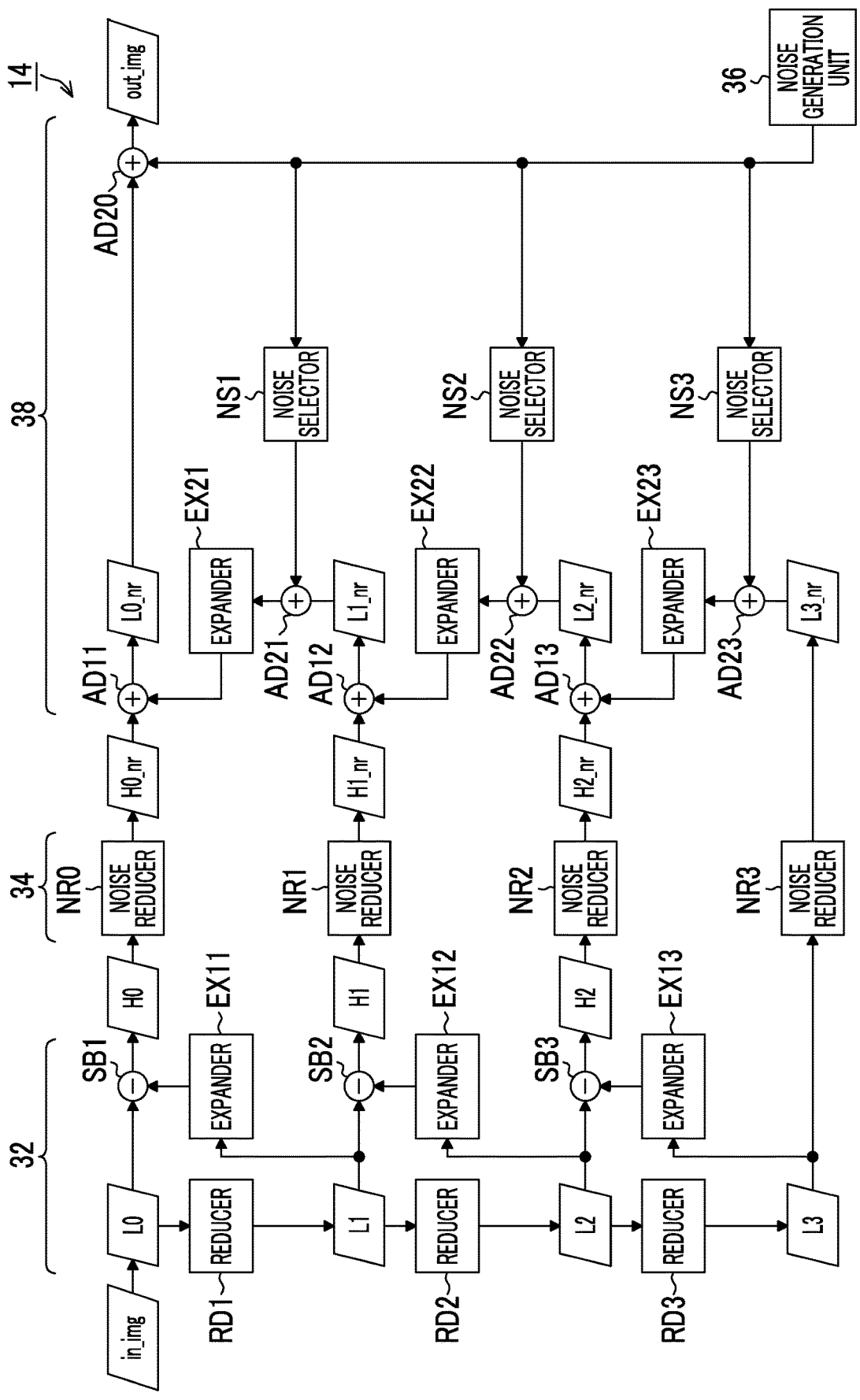
FIG. 3 is a block diagram illustrating a configuration example of a first example of a main part of an image processing unit.

FIG. 3 is a block diagram illustrating a configuration of a first example of a main part of the image processing unit 14 illustrated in FIG. 1. The multiresolution transform unit 32 is configured to include a plurality of reducers RD1, RD2, and RD3, a plurality of expanders EX11, EX12, and EX13, and a plurality of subtractors SB1, SB2, and SB3. The noise reducing unit 34 is configured to include a plurality of noise reducers NR0, NR1, NR2, and NR3. The reverse multiresolution transform unit 38 is configured to include a plurality of expanders EX21, EX22, and EX23, a plurality of adders AD11, AD12, and AD13 for image composition, a plurality of adders AD20, AD21, AD22, and AD23 for the noise addition, and a plurality of noise selectors NS1, NS2, and NS3.

First, the multiresolution transform process including the image size reduction (downsampling) performed by the multiresolution transform unit 32 will be described.

A first minified picture L1 is generated by reducing a non-minified picture L0 by the reducer RD1 using an input image in_img as the non-minified picture L0 (one aspect of the "original image"). A second minified picture L2 is generated by reducing the first minified picture L1 by the reducer RD2. A third minified picture L3 is generated by reducing the second minified picture L2 by the reducer RD3.

All of the non-minified picture L0, the first minified picture L1, and the second minified picture L2 are two-dimensional images. The size in the x direction and the size in the y direction are reduced by "½" by the reducers RD1, RD2, and RD3. That is, the image size of the first minified picture L1 is "½×½" of the original image (non-minified picture L0). The image size of the second minified picture L2 is "¼×¼" of the original image. The image size of the third minified picture L3 is "⅛×⅛" of the original image. The reducers RD1, RD2, and RD3 of the present example perform a low pass filter (LPF) process and a thinning-out process.

The first minified picture L1 is expanded by the expander EX11. The expansion result is subtracted from the non-minified picture L0 by the subtractor SB1, and a band image H0 of a resolution level 0 that is the same resolution as the original image is generated. The second minified picture L2 is expanded by the expander EX12. The expansion result is subtracted from the first minified picture L1 by the subtractor SB2, and a band image H1 of a resolution level 1 that is a lower resolution than the original image is generated. The third minified picture L3 is expanded by the expander EX13. The expansion result is subtracted from the second minified picture L2 by the subtractor SB3, and a band image H2 of a resolution level 2 that is a lower resolution than the band image H1 of the resolution level 1 is generated. The third minified picture L3 is a band image (hereinafter, referred to as a "band image of a resolution level 3") in a lower resolution than the band image H2 of the resolution level 2. The size in the x direction and the size in the y direction are expanded twice by the expanders EX11, EX12, and EX13. The image size of the band image H0 of the resolution level 0 is equal to the original image. The image size of the band image H1 of the resolution level 1 is "½×½" of the original image. The image size of the band image H2 of the resolution level 2 is "¼×¼" of the original image. The image size of the band image L3 of the resolution level 3 is "⅛×⅛" of the original image. In a case where all of the band images H0, H1, H2, and L3 of the resolution levels 0 to 3 are composited, an image equal to the original image is generated. That is, in the case of performing the multiresolution transform including the image size reduction (downsampling), it is necessary to configure the image again by the reverse multiresolution transform including the image size expansion (upsampling).

While the multiresolution transform unit 32 of the present example generates four band images H0, H1, H2, and L3 by separating the original image into four bands (four resolutions), the present invention is not particularly limited to such a case. For example, the original image may be separated into three bands or may be separated into five or more bands.

Next, the noise reducing process performed by the noise reducing unit 34 will be described.

The band image H0 of the resolution level 0, the band image H1 of the resolution level 1, the band image H2 of the resolution level 2, and the band image L3 of the resolution level 3 are subjected to edge-preserving smoothing as the noise reducing process by the noise reducers NR0, NR1, NR2, and NR3, respectively. Accordingly, a noise-reduced band image H0_nr of the resolution level 0, a noise-reduced band image H1_nr of the resolution level 1, a noise-reduced band image H2_nr of the resolution level 2, and a noise-reduced band image L3_nr of the resolution level 3 are generated. For example, the edge-preserving smoothing corresponds to a process of determining the direction of a component in the band image and performing filtering for each direction.

Next, the reverse multiresolution transform process including the image size expansion (upsampling) and the noise addition process performed by the reverse multiresolution transform unit 38 of the present example will be described.

For example, for each pixel, the adder AD23 adds a noise signal to the noise-reduced band image L3_nr of the resolution level 3. The added noise signal is a part selected by the noise selector NS3 of the resolution level 3 in the original noise signal generated by the noise generation unit 36. The band image L3_nr of the resolution level 3 to which the noise signal is added is expanded by 2×2 by the expander EX23. The adder AD13 adds the expansion result to the noise-reduced band image H2_nr of the resolution level 2, and an in-processing image L2_nr of the resolution level 2 is generated.

For example, for 2×2 pixels at a time, the adder AD22 adds a noise signal to the in-processing image L2_nr of the resolution level 2. The added noise signal is a part selected by the noise selector NS2 of the resolution level 2 in the original noise signal generated by the noise generation unit 36. The in-processing image L2_nr of the resolution level 2 to which the noise signal is added is expanded by 2×2 by the expander EX22. The adder AD12 adds the expansion result to the noise-reduced band image H1_nr of the resolution level 1, and an in-processing image L1_nr of the resolution level 1 is generated.

For example, for 4×4 pixels at a time, the adder AD21 adds a noise signal to the in-processing image L1_nr of the resolution level 1. The added noise signal is a part selected by the noise selector NS1 of the resolution level 1 in the original noise signal generated by the noise generation unit 36. The in-processing image L1_nr of the resolution level 1 to which the noise signal is added is expanded by 2×2 by the expander EX21. The adder AD11 adds the expansion result to the noise-reduced band image H0_nr of the resolution level 0, and an in-processing image L0_nr of the resolution level 0 is generated.

For example, for 8×8 pixels at a time, the adder AD20 adds a noise signal to the in-processing image L0_nr of the resolution level 0. The added noise signal is the original noise signal generated by the noise generation unit 36.

For example, the noise generation unit 36 generates consecutive pseudorandom number data as the original noise signal. The original noise signal of the present example is a digital signal and, for example, can be configured with a "1" signal and a "0" signal indicating whether or not to add the noise for each pixel. The original noise signal may be configured with a random number indicating the intensity of the noise for each pixel, and a configuration in which switching of the intensity of the noise to be added and switching between adding and not adding the noise are performed depending on the magnitude of the random number may be used.

The noise selectors NS1, NS2, and NS3 of the present example generate the actual noise signal to be added by performing a process of thinning out the original noise signal generated by the noise generation unit 36 depending on the resolution. For example, the noise selector NS1 of the resolution level 1 extracts a 4×4 pixel noise signal from the 8×8 pixel original noise signal consecutive in time. The noise selector NS2 of the resolution level 2 extracts a 2×2 pixel noise signal from the 8×8 pixel original noise signal. The noise selector NS3 of the resolution level 3 extracts a 1-pixel noise signal from the 8×8 pixel original noise signal. While a noise selector of the resolution level 0 is not included in the present example, the noise selector of the resolution level 0 is disposed in a case where the original noise signal and a noise signal of the resolution level 0 have different sizes.

The in-processing image L0_nr of the resolution level 0 to which the noise signal is added is output as an output image out_img from the image output unit 16 in FIG. 1. That is, the output image out_img is output as a processing result of the reverse multiresolution transform unit 38 that performs the reverse multiresolution transform process while performing the noise addition process in each resolution.

Figure 4:
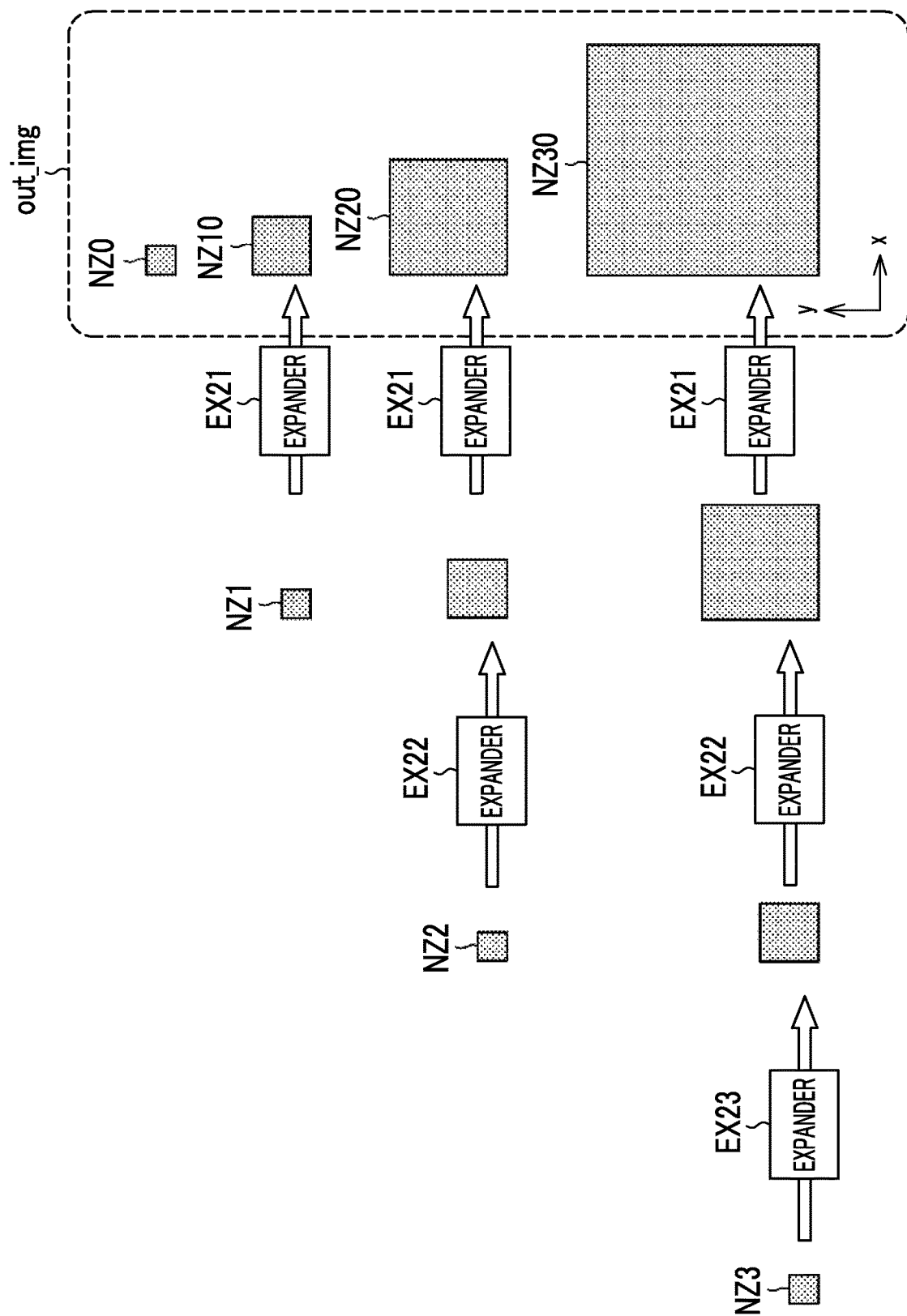
FIG. 4 is a descriptive diagram used for describing a relationship between image size expansion in a reverse multiresolution transform and the size of a noise in an output image.

A relationship between the image size expansion (upsampling) in the reverse multiresolution transform and the size of the noise in the output image out_img will be described using FIG. 4.

For example, it is assumed that a 1-pixel noise is added in each of four resolutions (four bands). Then, a 1-pixel noise NZ3 added at the resolution level 3 is expanded by three expanders EX23, EX22, and EX21 and consequently, becomes a noise NZ30 having a size of 8×8 pixels in the output image out_img. A 1-pixel noise NZ2 added at the resolution level 2 is expanded by two expanders EX22 and EX21 and consequently, becomes a noise NZ20 having a size of 4×4 pixels in the output image out_img. A 1-pixel noise NZ1 added at the resolution level 1 is expanded by one expander EX21 and consequently, becomes a noise NZ10 having a size of 2×2 pixels in the output image out_img. A 1-pixel noise NZ0 added at the resolution level 0 has a size of 1 pixel in the output image out_img.

The number of resolutions (number of bands), the size of the noise to be added, and the size of the noise formed in the output image out_img in the above description are examples for easy understanding and can be appropriately decided considering a processing speed and the cost and the size of hardware. In addition, the present invention is not limited to the case of performing the noise addition in all resolutions. The noise addition may be performed in one or more resolutions (one or more bands) selected as will be described in the subsequent example.

As described thus far, according to the reverse multiresolution transform unit 38 of the present example, a configuration in which the expanders EX21, EX22, and EX23 for image size expansion necessary in the reverse multiresolution transform process are also used for expanding the noise size is used. Thus, it is not necessary to add a new expander for noise size expansion. In other words, the reverse multiresolution transform unit 38 of the present example is configured to perform the noise addition process before the image size expansion for each resolution in the reverse multiresolution transform process. Thus, noises of a plurality of sizes can be formed in the output image out_img without adding a new expander. The noise addition process may be performed using not only the expander but also other elements for the reverse multiresolution transform process.

<<Parallel Processing of Noise Addition>>

The multiresolution transform unit 32 in FIG. 1 is configured to perform the noise addition process in parallel in a plurality of resolutions (at least two resolutions). Hereinafter, parallel processing of the noise addition in the configuration example illustrated in FIG. 3 will be described in further detail using FIG. 5.

Figure 5:
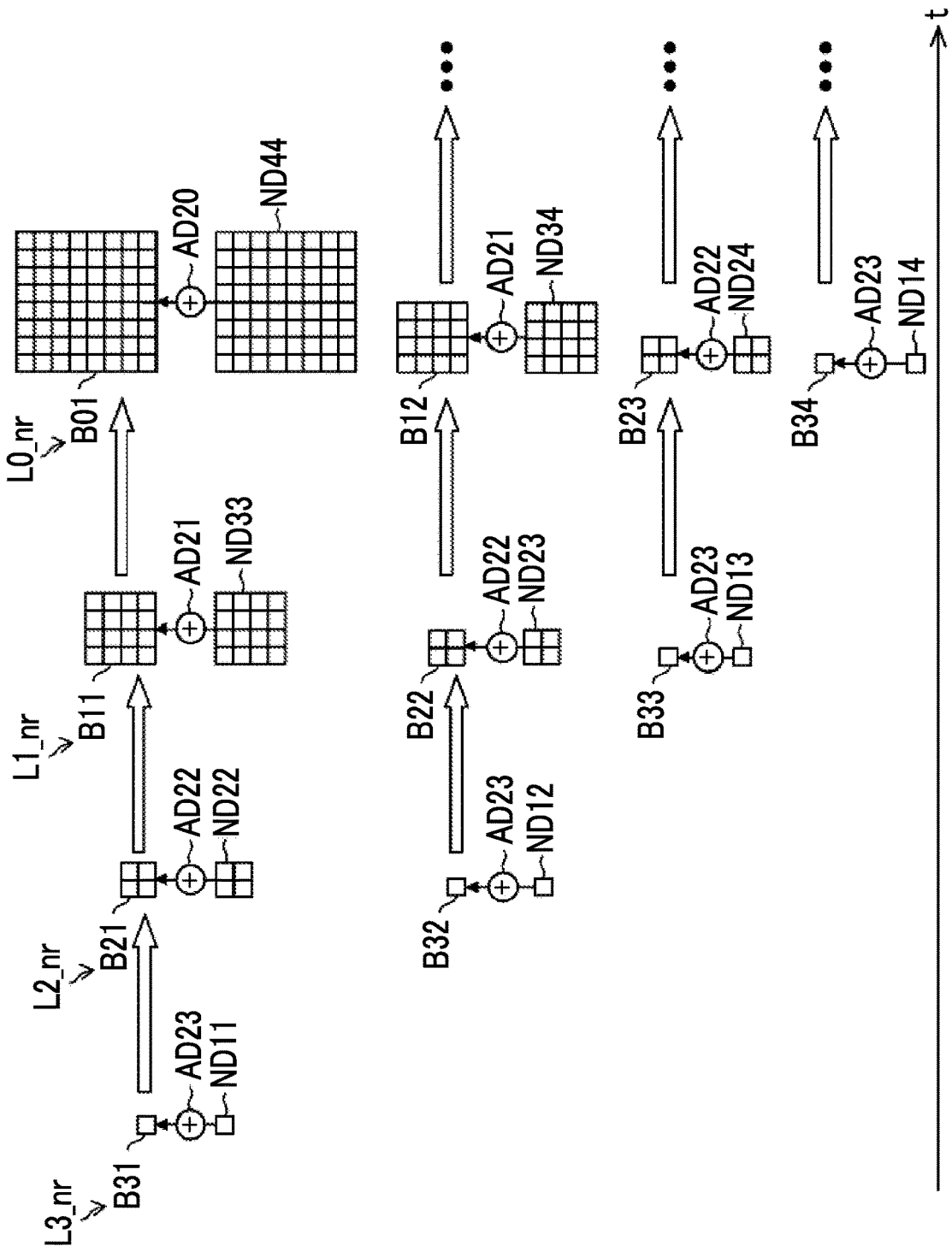
FIG. 5 is a descriptive diagram schematically illustrating a state where a noise addition process is performed in parallel in a plurality of resolutions.

In FIG. 5, it is assumed that 1-pixel blocks B31, B32, B33, and B34 (subsequent blocks are not illustrated) are sequentially extracted from the noise-reduced band image L3_nr of the resolution level 3 (lowest resolution) along with an elapse of time t. The adder AD23 for the noise addition of the resolution level 3 sequentially adds 1-pixel noise signals ND11, ND12, ND13, and ND14 (subsequent noise signals are not illustrated) to the extracted 1-pixel blocks B31, B32, B33, and B34. The blocks B31, B32, B33, and B34 to which the noise signals are added are sequentially expanded by 2×2 and are embedded in the in-processing image L2_nr of the resolution level 2 as 2×2 pixel blocks B21, B22, and B23 (subsequent blocks are not illustrated). In addition, the adder AD22 for the noise addition of the resolution level 2 sequentially adds 2×2 pixel noise signals ND22, ND23, and ND24 (subsequent noise signals are not illustrated) to the blocks B21, B22, and B23 in the in-processing image L2_nr of the resolution level 2. The blocks B21, B22, and B23 to which the noise signals are added are sequentially expanded by 2×2 and are embedded in the in-processing image L1_nr of the resolution level 1 as 4×4 pixel blocks B11 and B12 (subsequent blocks are not illustrated). In addition, the adder AD21 for the noise addition of the resolution level 1 sequentially adds 4×4 pixel noise signals ND33 and ND34 (subsequent noise signals are not illustrated) to the blocks B11 and B12 in the in-processing image L1_nr of the resolution level 1. The blocks B11 and B12 to which the noise signals are added are sequentially expanded by 2×2 and are embedded in the in-processing image L0_nr of the resolution level 0 as an 8×8 pixel block B01 (subsequent blocks are not illustrated). In addition, the adder AD20 for the noise addition of the resolution level 0 sequentially adds an 8×8 pixel noise signal ND44 (subsequent noise signals are not illustrated) to the block B01 in the in-processing image L0_nr of the resolution level 0.

In the parallel processing, the plurality of adders AD20, AD21, AD22, and AD23 for the noise addition perform the noise addition in parallel in the plurality of resolutions (in the present example, four resolutions). In addition, the reverse multiresolution transform process and the noise addition process are performed in parallel. That is, even in a case where the noise addition process is embedded in the reverse multiresolution transform process, it is understood that an increase of the whole processing time can be slightly reduced, compared to that in a case where the noise addition process is not embedded in the reverse multiresolution transform process.

The parallel processing of the noise addition illustrated in FIG. 5 is supported by selecting the actual noise to be added in a different data size for each resolution from the original noise signal by the noise selectors NS1 to NS3 in the configuration example illustrated in FIG. 3.

In the description of the parallel processing of the noise addition, the size of the block (B31 to B34, B21 to B23, B11 to B12, and B01) extracted at a time from each image and the size of the noise signal (ND11 to ND14, ND22 to ND24, ND33 to ND34, and ND44) added at a time are examples for easy understanding and can be appropriately decided considering the processing speed and the cost and the size of hardware. In addition, the present invention is not limited to a case where the noise addition is performed in the plurality of resolutions at the same time. The timing of the noise addition may be shifted between the resolutions.

Second Example

Figure 6:
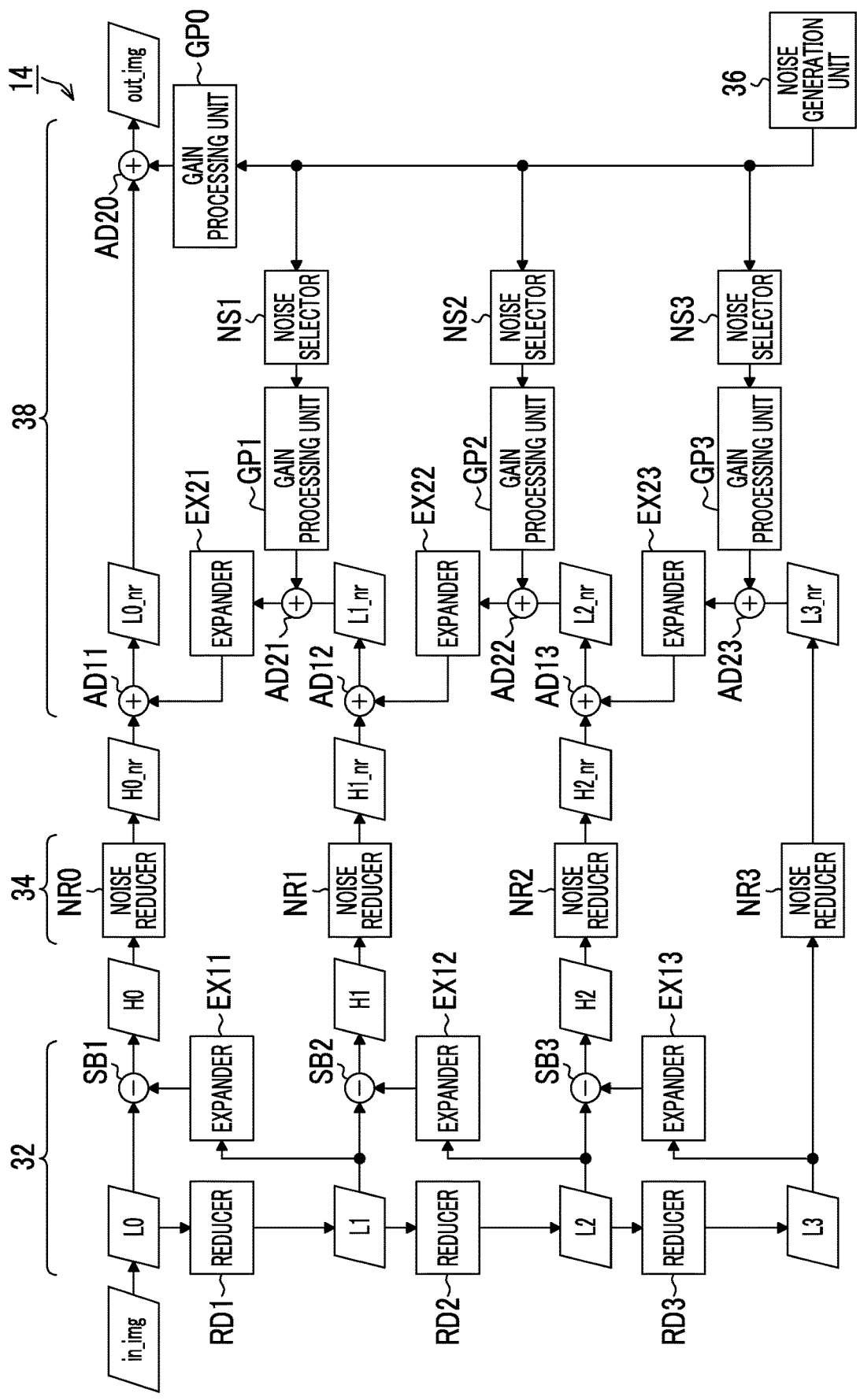
FIG. 6 is a block diagram illustrating a configuration example of a second example of the main part of the image processing unit.

FIG. 6 is a block diagram illustrating a configuration of a second example of a main part of the image processing unit 14 illustrated in FIG. 1. The same constituents as the image processing unit 14 of the first example illustrated in FIG. 3 will be designated by the same reference signs, and the contents already described will not be repeated below.

The image processing unit 14 of the present example comprises a plurality of gain processing units GP0, GP1, GP2, and GP3 that adjust the intensity of the noise to be added by multiplying the noise to be added by a gain. Hereinafter, the plurality of gain processing units GP0, GP1, GP2, and GP3 may be collectively referred to as a "gain processing unit GP". The "gain" is the ratio of the input noise to the output noise. In the present example, the gain is the ratio of the intensity of the noise input into the gain processing unit GP to the intensity of the noise output from the gain processing unit GP (that is, the intensity of the noise to be added by the adders AD20 to AD23 for the noise addition).

The gain processing unit GP of the present example can adjust the intensity of the noise to be added for each resolution by multiplying the noise by the gain different for each resolution. That is, the intensity of the noise formed in the output image can be adjusted for each size of the noise in the output image.

As already described in the first example, the size of the noise formed in the output image depends on the resolution at the time of the noise addition. That is, the upsampling (image size expansion) in the reverse multiresolution transform process is in connection with the noise size expansion. However, according to the gain processing unit GP of the present example, switching between adding and not adding the noise can be performed for each resolution by switching between setting and not setting the gain to zero for each resolution. That is, the gain processing unit GP of the present example is one aspect of a "noise size adjusting unit" in the embodiment of the present invention. The gain processing unit GP has not only a function of adjusting the intensity of the noise but also a function of adjusting the size of the noise formed in the output image.

For example, in a case where it is desirable to form only a noise having a size of 2×2 pixels (vertical 2 pixels× horizontal 2 pixels) in the output image, the gains of the gain processing unit GP3 of the resolution level 3, the gain processing unit GP2 of the resolution level 2, and the gain processing unit GP0 of the resolution level 0 are set to zero, and the gain of the gain processing unit GP1 of the resolution level 1 is set to be greater than zero. By switching between setting and not setting the gain to zero for each resolution, a noise of a desired size can be formed in the output image.

In addition, the control unit 20 (refer to FIG. 1) of the present example is one aspect of a "region determination unit" in the embodiment of the present invention. The control unit 20 determines a low brightness region ("first brightness region") and a high brightness region ("second brightness region" having a higher brightness than the "first brightness region") in the original image. In addition, the control unit 20 of the present example is one aspect of a "gain control unit" in the embodiment of the present invention. The control unit 20 sets the gain to be different for the noise of the gain processing unit GP depending on the low brightness region and the high brightness region. The region determination performed by the control unit 20 is not limited to the case of determining two brightness regions having different brightnesses and may be the case of determining three or more brightness regions having different brightnesses. In addition, the gain control performed by the control unit 20 may be the case of setting a different brightness-dependent gain in three or more regions having different brightnesses.

For example, in the case of adding granularity as in the case of creating a silver halide photo from a film, it is preferable to adjust the gain depending on the brightness of each region in the original image.

For example, a silver halide photo (positive photo) created from a negative film has characteristics such that granularity is seen in a shadow part (low brightness region), and granularity is barely seen in a highlight part (high brightness region). In order to create an image having granularity similar to the silver halide photo, in a case where the original image is a positive image (positive picture image), the control unit 20 of the present example sets the gain of the random noise to be added to a pixel corresponding to the high brightness region (second brightness region) of the original image to be smaller than the gain of the random noise to be added to a pixel corresponding to the low brightness region (first brightness region) of the original image in the target image to which the random noise is added. In other words, in the positive image, the gain of the random noise for the low brightness region (first brightness region) is set to be greater than the gain of the random noise for the high brightness region (second brightness region). In addition, in a case where the original image is a negative image (negative picture image), the control unit 20 of the present example sets the gain of the random noise to be added to the pixel corresponding to the low brightness region (first brightness region) of the original image to be smaller than the gain of the random noise to be added to the pixel corresponding to the high brightness region (second brightness region) of the original image in the target image to which the random noise is added. In other words, in the negative image, the gain of the random noise for the high brightness region (second brightness region) is set to be greater than the gain of the random noise for the low brightness region (first brightness region).

As described thus far, according to the present example, the intensity of the noise can be adjusted by the gain depending on the intention of a design or the intension of a user. In addition, according to the present example, the size of the noise formed in the output image can be adjusted independently of the number of band divisions in the multiresolution transform process.

<Variations of Noise Addition>

Variations of the noise addition will be described.

Figure 7:
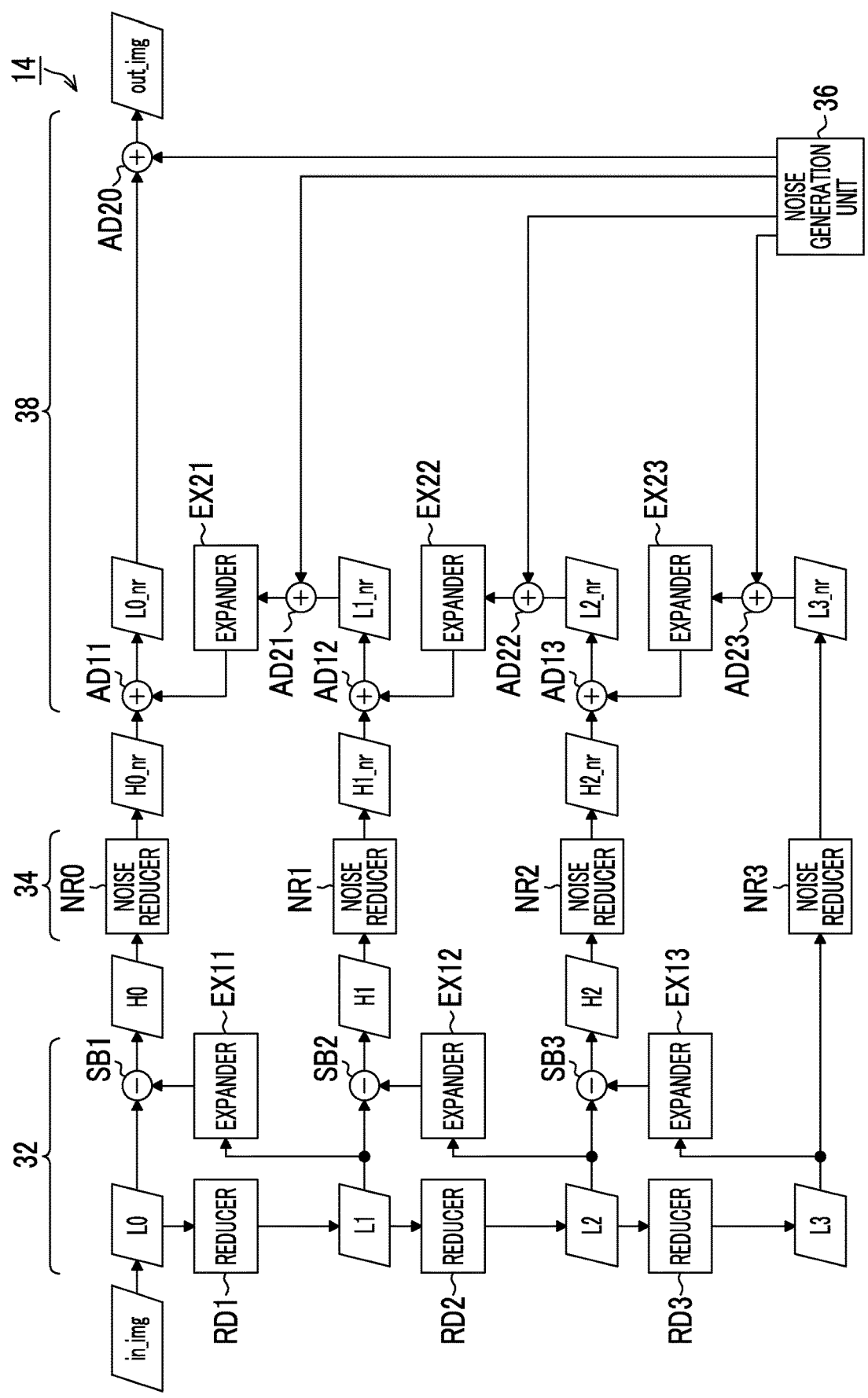
FIG. 7 is a block diagram illustrating a configuration example of the main part of the image processing unit in the case of outputting an individual noise signal for each resolution.

While a configuration in which the common original noise signal for the plurality of adders AD20 to AD23 (one aspect of a "noise addition unit") for the noise addition is output from the noise generation unit 36 is illustratively described in the first example and the second example, the present invention is not limited to such a case. For example, as illustrated in FIG. 7, a configuration in which an individual noise signal for each of the plurality of adders AD20 to AD23 (noise addition unit) for the noise addition is output from the noise generation unit 36 may be used.

A case where 1 pixel is sequentially extracted at a time from the noise-reduced band image L3_nr of the lowest resolution (in the present example, the resolution level 3), and the image size expansion for each resolution in the reverse multiresolution transform process is performed by 2×2 will be illustratively described. In such a case, a noise signal in units of 1 pixel is output to the adder AD23 for the noise addition of the resolution level 3. A noise signal in units of 2×2 pixels is output to the adder AD22 for the noise addition of the resolution level 2. A noise signal in units of 4×4 pixels is output to the adder AD21 for the noise addition of the resolution level 1. A noise signal in units of 8×8 pixels is output to the adder AD20 for the noise addition of the resolution level 0. That is, a configuration in which individual noises of different data sizes for each resolution are provided to the adders AD20 to AD23 (noise addition unit) for the noise addition is used.

In the present example, the parallel processing of the noise addition illustrated in FIG. 5 is supported by setting the noise signal of a different data amount (noise data amount) to be provided to the noise addition unit (adders AD20 to AD23) depending on the resolution.

Figure 8:
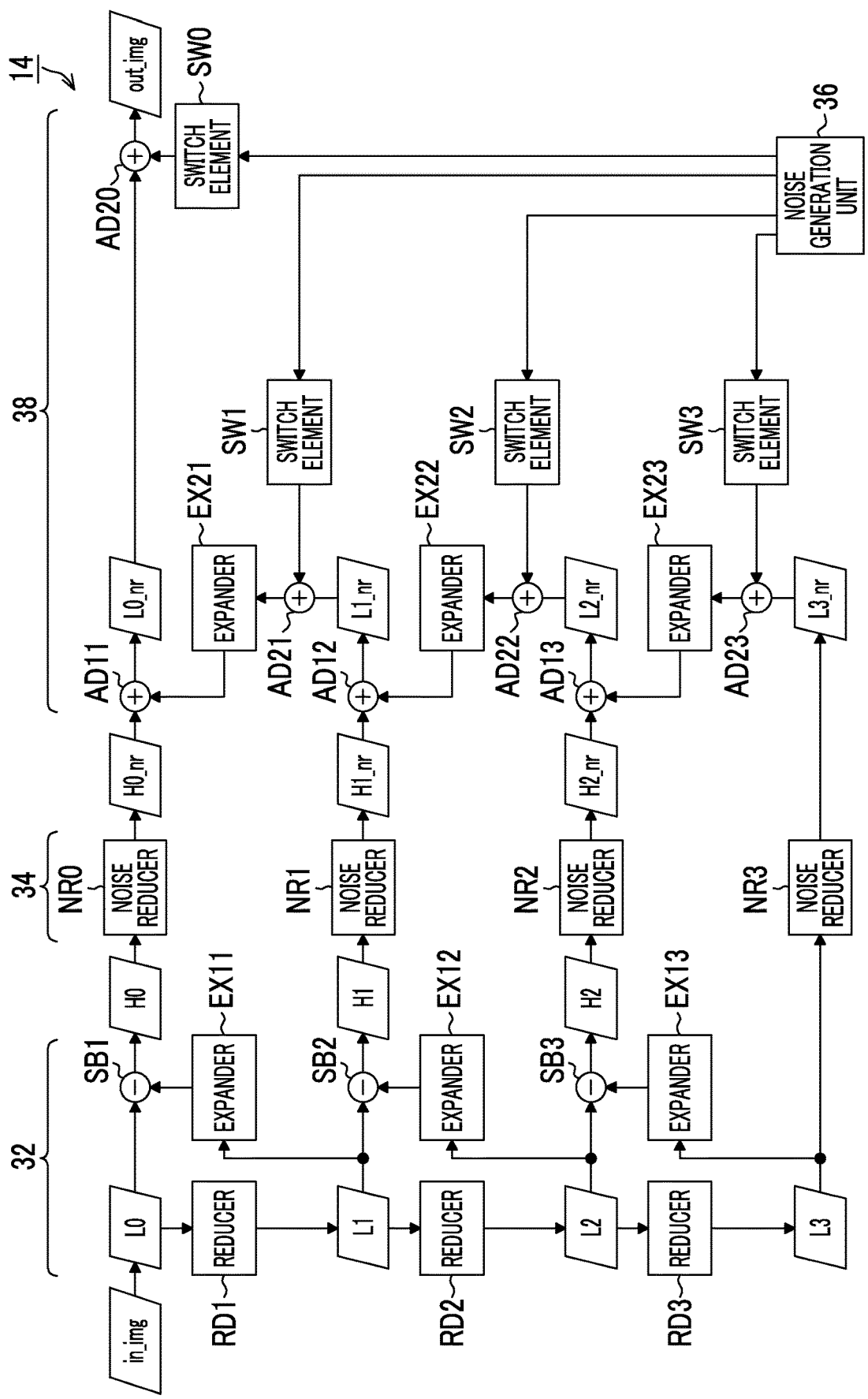
FIG. 8 is a block diagram illustrating a configuration example of the image processing unit in the case of using a switch element switching between adding and not adding a noise for each resolution.

In addition, while a case where switching between adding and not adding the noise is performed for each resolution by setting the gain of the gain processing unit GP to zero is illustratively described in the second example, the present invention is not limited to such a case. For example, as illustrated in FIG. 8, a configuration in which switching between adding and not adding the noise is performed for each resolution using switch elements SW0, SW1, SW2, and SW3 having an ON state and an OFF state may be used. That is, while the second example is advantageous from the viewpoint that the gain processing unit GP can adjust the intensity of the noise and adjust the size of the noise, the configuration illustrated in FIG. 8 may be used in a case where it is desirable to adjust only the size of the noise.

In addition, a case where the noise is added to the band image L3_nr immediately after output from the noise reducer NR3 in only the lowest resolution (resolution level 3), and the noise is added to the in-processing images L1_nr and L2_nr in the middle of the reverse multiresolution transform process in other resolutions (resolution levels 1 and 2) lower than the resolution of the original image is illustratively described in the first example and the second example. However, the present invention is not limited to such a case. A configuration in which the noise is added to the band images H0_nr, H1_nr, and H2_nr immediately after output from the noise reducers NR0 to NR2 even in a resolution (for example, the resolution levels 0 to 2) other than the lowest resolution may be used. The noise addition unit 39 in the embodiment of the present invention adds the noise to an image that is any of the noise-reduced band image and the image in the middle of the reverse multiresolution process in a lower resolution than the resolution of the original image.

In addition, while a case where the random noise is added is illustratively described, the present invention can be applied to a case where a noise having regularity is added.

<Variations of Multiresolution Transform>

The multiresolution transform process is not limited to the case of using a Laplacian pyramid. The present invention can be applied to any case of decomposing the original image into bands and performing the reverse multiresolution transform including the image size expansion. For example, examples include the case of using a wavelet transform and the case of using a Fourier transform.

<Variations of Hardware Structure>

In the present embodiment, a hardware structure for executing various processes (the multiresolution transform process, the noise reducing process, the noise generation process, the noise addition process, the reverse multiresolution transform process, and the like) in the image processing unit 14 (the multiresolution transform unit 32, the noise reducing unit 34, the noise generation unit 36, and the reverse multiresolution transform unit 38) and the control unit 20 illustrated in FIG. 1 can be configured with various processors illustrated below. The various processors include a central processing unit (CPU) that is a general-purpose processor executing various processes by software (program), a programmable logic device (PLD) such as a field programmable gate array (FPGA) that is a processor enabling a change of a circuit configuration after manufacturing, a dedicated electric circuit such as an application specific integrated circuit (ASIC) that is a processor having a circuit configuration dedicatedly designed for executing a specific process, and the like.

The functions of the image processing unit 14 and the control unit 20 may be implemented by one of the various processors or may be implemented by two or more processors of the same type or different types (for example, a plurality of FPGAs or a combination of a CPU and an FPGA). In addition, a plurality of functions may be implemented by one processor. An example of implementing the plurality of functions by one processor is the use of a processor that implements the function of the whole system including the plurality of functions by one integrated circuit (IC) chip represented by a system on chip (SoC) or the like. Various functions are implemented using one or more of the various processors as the hardware structure. Furthermore, the hardware structure of the various processors is more specifically an electric circuit (circuitry) in which circuit elements such as a semiconductor element are combined.

<Configuration Example of Digital Camera>

Figure 9:
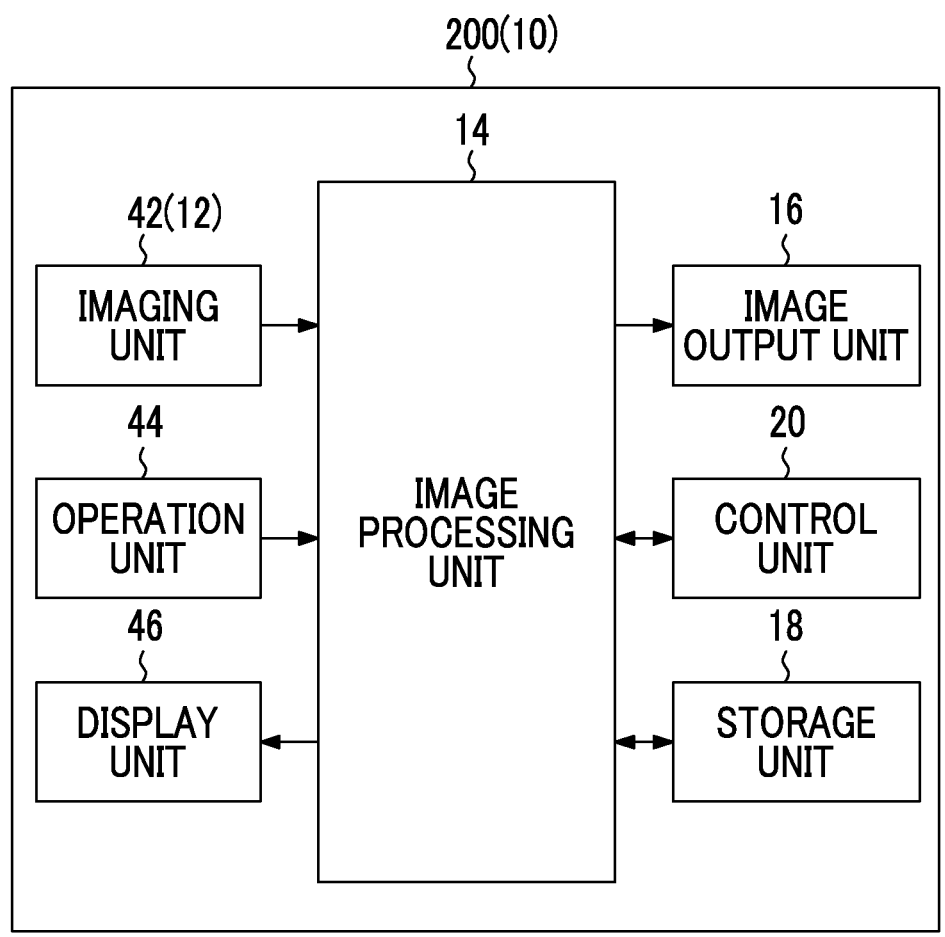
FIG. 9 is a block diagram illustrating a configuration example of a digital camera to which the noise processing apparatus according to the embodiment of the present invention is applied.

FIG. 9 is a block diagram illustrating a configuration example of a digital camera to which the noise processing apparatus 10 in FIG. 1 is applied. In FIG. 9, the same constituents as the noise processing apparatus 10 illustrated in FIG. 1 will be designated by the same reference signs, and the contents already described will not be repeated below.

A digital camera 200 of the present example comprises an imaging unit 42 as the picture input unit 12 in FIG. 1. The imaging unit 42 is configured to include an optical system for imaging (imaging optical system) and an imaging element. An imaging device such as a complementary metal oxide semiconductor (CMOS) imaging device or a charge coupled device (CCD) imaging device is used as the imaging element. In addition, the digital camera 200 is configured to include an operation unit 44 receiving an instruction input from the user and a display unit 46 displaying various information including an image to the user. The operation unit 44 is configured with an operation device such as a touch panel. The operation unit 44 may be configured with a hardware switch. The display unit 46 is configured with a display device such as a liquid crystal display device.

A digital camera in which the imaging optical system can be replaced may be used as the digital camera 200.

<Configuration Example of Smartphone>

Figure 10:
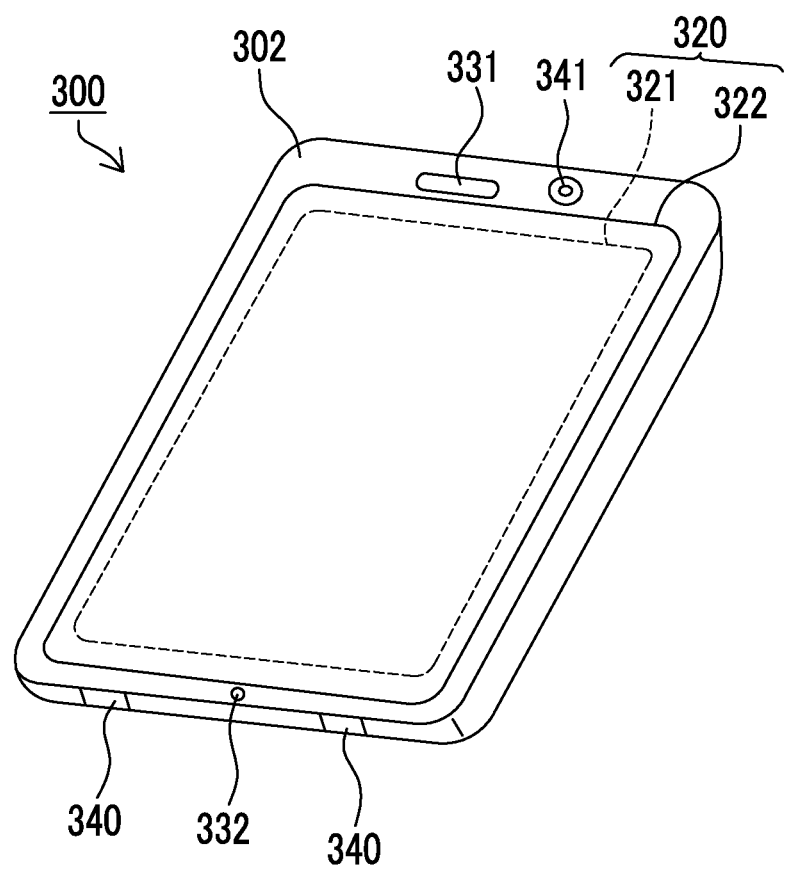
FIG. 10 is an exterior view of one example of a smartphone to which the present invention is applied.

FIG. 10 is an exterior view of one example of a smartphone to which the present invention is applied. A smartphone 300 illustrated in FIG. 10 includes a casing 302 having a shape of a flat plate and comprises a display and input unit 320 in which a display panel 321 and an operation panel 322 are integrated on one surface of the casing 302. In addition, the casing 302 comprises a speaker 331, a microphone 332, an operation unit 340, and a camera unit 341. The configuration of the casing 302 is not for limitation purposes. For example, a configuration in which the display unit and the input unit are independently disposed can be employed, or a configuration having a folded structure or a sliding mechanism can be employed.

Figure 11:
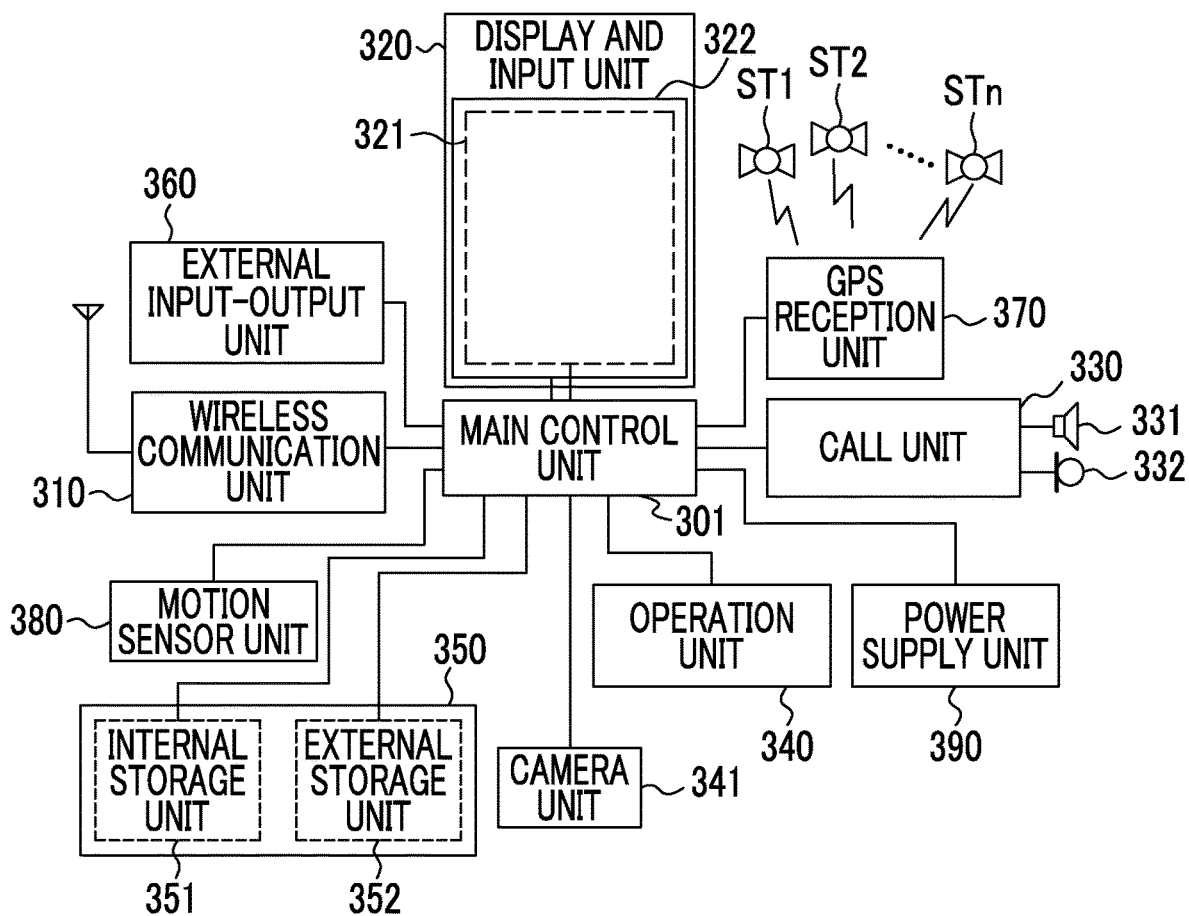
FIG. 11 is a block diagram illustrating a configuration example of the smartphone in FIG. 10.

FIG. 11 is a block diagram illustrating a configuration example of the smartphone 300 in FIG. 10. As illustrated in FIG. 11, main constituents of the smartphone comprise a wireless communication unit 310, the display and input unit 320, a call unit 330, the operation unit 340, the camera unit 341, a storage unit 350, an external input-output unit 360, a global positioning system (GPS) reception unit 370, a motion sensor unit 380, a power supply unit 390, and a main control unit 301. In addition, a main function of the smartphone 300 includes a wireless communication function of performing mobile wireless communication with a base station apparatus through a mobile communication network.

The wireless communication unit 310 performs wireless communication with the base station apparatus accommodated in the mobile communication network in accordance with an instruction from the main control unit 301. Using the wireless communication, transmission and reception of various file data such as voice data and image data, electronic mail data, and the like and reception of Web data, streaming data, and the like are performed.

The display and input unit 320 is a so-called touch panel that visually delivers information to the user by displaying images (still images and moving images), text information, and the like and detects a user operation in response to the displayed information under control of the main control unit 301. The display and input unit 320 comprises the display panel 321 and the operation panel 322.

The display panel 321 uses a liquid crystal display (LCD), an organic light emitting diode (OLED) display, or the like as a display device. The operation panel 322 is a device that is mounted in a manner enabling visual recognition of an image displayed on a display surface of the display panel 321 and detects one or a plurality of coordinates operated by a finger of the user or a pen type input device. In a case where the device is operated by the finger of the user or the pen type input device, a detection signal caused by the operation is output to the main control unit 301. Next, the main control unit 301 detects the position (coordinates) of the operation on the display panel 321 based on the received detection signal.

As illustrated in FIG. 10, the display panel 321 and the operation panel 322 of the smartphone 300 are integrated and constitute the display and input unit 320. The operation panel 322 is arranged to completely cover the display panel 321. In a case where such an arrangement is employed, the operation panel 322 may have a function of detecting the user operation even in a region outside the display panel 321. In other words, the operation panel 322 may comprise a detection region (hereinafter, referred to as a display region) for an overlapping part in overlap with the display panel 321 and a detection region (hereinafter, referred to as a non-display region) for a peripheral part other than the overlapping part not in overlap with the display panel 321.

While the size of the display region may completely match the size of the display panel 321, both sizes may not necessarily match. In addition, the operation panel 322 may comprise two sensitive regions including the peripheral part and an inner part other than the peripheral part. Furthermore, the width of the peripheral part is appropriately designed depending on the size and the like of the casing 302. Furthermore, a position detection method employed in the operation panel 322 is exemplified by a matrix switch method, a resistive film method, a surface acoustic wave method, an infrared method, an electromagnetic induction method, an electrostatic capacitive method, and the like. Any method can be employed.

The call unit 330 comprises the speaker 331 and the microphone 332. The call unit 330 converts the voice of the user input through the microphone 332 into voice data processable in the main control unit 301 and outputs the voice data to the main control unit 301, or decodes the voice data received by the wireless communication unit 310 or the external input-output unit 360 and outputs the decoded voice data from the speaker 331. In addition, as illustrated in FIG. 10, for example, the speaker 331 can be mounted on the same surface as the surface on which the display and input unit 320 is disposed, and the microphone 332 can be mounted on a side surface of the casing 302.

The operation unit 340 is a hardware key in which a key switch or the like is used, and receives an instruction from the user. For example, as illustrated in FIG. 10, the operation unit 340 is a push-button type switch that is mounted on a side surface of the casing 302 of the smartphone 300 and is set to be in an ON state in a case where the operation unit 340 is pressed with a finger or the like and is set to be in an OFF state by restoring force of a spring or the like in a case where the finger is released.

The storage unit 350 stores a control program and control data of the main control unit 301, application software, address data in which the name, the telephone number, and the like of a communication counterpart are associated, data of transmitted and received electronic mails, Web data downloaded by Web browsing, and downloaded contents data. In addition, the storage unit 350 temporarily stores streaming data and the like. In addition, the storage unit 350 is configured with an internal storage unit 351 incorporated in the smartphone and an attachable and detachable external storage unit 352 including an external memory slot. Each of the internal storage unit 351 and the external storage unit 352 constituting the storage unit 350 is implemented using a storage medium such as a flash memory type, hard disk type, multimedia card micro type, or card type memory (for example, a MicroSD (registered trademark) memory)), a random access memory (RAM), or a read only memory (ROM).

The external input-output unit 360 operates as an interface for all external devices connected to the smartphone 300 and is for directly or indirectly connecting to other external devices using communication or the like (for example, Universal Serial Bus (USB)) or a network (for example, the Internet, a wireless local area network (LAN), Bluetooth (registered trademark), radio frequency identification (RFID), infrared communication (Infrared Data Association: IrDA) (registered trademark), Ultra Wide Band (UWB) (registered trademark), or ZigBee (registered trademark)).

For example, the external device connected to the smartphone 300 is a wired/wireless headset, a wired/wireless external charger, a wired/wireless data port, a memory card or a subscriber identity module card (SIM card)/user identity module card (UIM card) connected through a card socket, an external audio and video device connected through an audio and video input/output (I/O) terminal, a wirelessly connected external audio and video device, a smartphone connected in a wired/wireless manner, a personal computer connected in a wired/wireless manner, a personal digital assistant (PDA) connected in a wired/wireless manner, or an earphone. The external input-output unit can deliver data transferred from the external device to each constituent inside the smartphone 300 or transfer data inside the smartphone 300 to the external device.

The GPS reception unit 370 receives GPS signals transmitted from GPS satellites ST1 to STn, executes a position measurement calculation process based on the plurality of received GPS signals, and detects the position of the smartphone 300 including latitude, longitude, and altitude in accordance with an instruction from the main control unit 301. When positional information can be acquired from the wireless communication unit 310 or the external input-output unit 360 (for example, a wireless LAN), the GPS reception unit 370 can detect the position using the positional information.

The motion sensor unit 380 comprises, for example, a 3-axis acceleration sensor and detects a physical motion of the smartphone 300 in accordance with the instruction from the main control unit 301. By detecting the physical motion of the smartphone 300, a direction or acceleration of movement of the smartphone 300 is detected. The detection result is output to the main control unit 301.

The power supply unit 390 supplies power stored in a battery (not illustrated) to each unit of the smartphone 300 in accordance with an instruction from the main control unit 301.

The main control unit 301 comprises a microprocessor. The main control unit 301 operates in accordance with the control program and the control data stored in the storage unit 350 and manages and controls each unit of the smartphone 300. In addition, the main control unit 301 has a mobile communication control function of controlling each unit of a communication system and an application processing function in order to perform voice communication and data communication through the wireless communication unit 310.

The application processing function is implemented by operating the main control unit 301 in accordance with the application software stored in the storage unit 350. For example, the application processing function is an infrared communication function of performing data communication with an opposing device by controlling the external input-output unit 360, an electronic mail function of transmitting and receiving electronic mails, or a Web browsing function of browsing a Web page.

In addition, the main control unit 301 has an image processing function such as displaying a video on the display and input unit 320 based on image data (still image or moving image data) such as reception data or downloaded streaming data. The image processing function is a function of causing the main control unit 301 to decode the image data, perform image processing on the decoding result, and display the image on the display and input unit 320.

Furthermore, the main control unit 301 executes display control for the display panel 321 and operation detection control for detecting the user operation through the operation unit 340 and the operation panel 322.

By executing the display control, the main control unit 301 displays an icon for starting the application software and a software key such as a scroll bar or displays a window for composing an electronic mail. The scroll bar is a software key for receiving an instruction to move a display part of an image for a large image or the like that is not accommodated in the display region of the display panel 321.

In addition, by executing the operation detection control, the main control unit 301 detects the user operation through the operation unit 340, receives an operation performed on the icon or an input of a text string in an input field of the window through the operation panel 322, or receives a scroll request for the display image through the scroll bar.

Furthermore, by executing the operation detection control, the main control unit 301 has a touch panel control function of determining whether the position of the operation performed on the operation panel 322 is in the overlapping part (display region) in overlap with the display panel 321 or the peripheral part (non-display region) other than the overlapping part not in overlap with the display panel 321 and controlling the sensitive region of the operation panel 322 and the display position of the software key.

In addition, the main control unit 301 can detect a gesture operation performed on the operation panel 322 and execute a preset function depending on the detected gesture operation. The gesture operation is not a simple touch operation in the related art and means an operation of drawing a trajectory with a finger or the like, specifying a plurality of positions at the same time, or drawing a trajectory from at least one of the plurality of positions by combining the drawing with the specifying.

The camera unit 341 is a digital camera performing electronic imaging using an imaging element such as a complementary metal oxide semiconductor (CMOS) imaging sensor or a charge coupled device (CCD) imaging sensor. In addition, the camera unit 341 can convert the image data acquired by imaging into compressed image data such as joint photographic coding experts group (JPEG) and record the image data in the storage unit 350 or output the image data through the external input-output unit 360 or the wireless communication unit 310 under control of the main control unit 301. As illustrated in FIG. 10, in the smartphone 300, the camera unit 341 is mounted on the same surface as the display and input unit 320. However, the mount position of the camera unit 341 is not for limitation purposes. The camera unit 341 may be mounted on the rear surface of the display and input unit 320. Alternatively, a plurality of camera units 341 may be mounted. In a case where the plurality of camera units 341 are mounted, imaging can be performed using a single camera unit 341 by switching the camera unit 341 performing imaging. Alternatively, imaging can be performed using the plurality of camera units 341 at the same time.

A comparison between the smartphone 300 of the present example and the noise processing apparatus 10 (basic configuration example of the noise processing apparatus) in FIG. 1 will be described. For example, the camera unit 341 is used as the picture input unit 12. The main control unit 301 is used as the image processing unit 14 and the control unit 20. The wireless communication unit 310 is used as the image output unit 16. The storage unit 350 is used as the storage unit 18. The external input-output unit 360 may be used as the picture input unit 12 and the image output unit 16.

While the embodiment of the present invention is described thus far, the present invention is not limited to the embodiment and the modification examples. Various modifications can be made without departing from the gist of the present invention.

EXPLANATION OF REFERENCES

- 10: noise processing apparatus
- 12: picture input unit
- 14: image processing unit
- 16: image output unit
- 18: storage unit
- 20: control unit
- 32: multiresolution transform unit
- 34: noise reducing unit
- 36: noise generation unit
- 38: reverse multiresolution transform unit
- 39: noise addition unit
- 42: imaging unit
- 44: operation unit
- 46: display unit
- 200: digital camera
- 300: smartphone
- 301: main control unit
- 302: casing
- 310: wireless communication unit
- 320: display and input unit
- 321: display panel
- 322: operation panel
- 330: call unit
- 331: speaker
- 332: microphone
- 340: operation unit
- 341: camera unit
- 350: storage unit
- 351: internal storage unit
- 352: external storage unit
- 360: external input-output unit
- 370: GPS reception unit
- 380: motion sensor unit
- 390: power supply unit
- AD11, AD12, AD13: adder for image composition
- AD20, AD21, AD22, AD23: adder for noise addition
- B01, B11, B12, B21, B22, B23, B31, B32, B33, B34: block
- EX11, EX12, EX13: expander of multiresolution transform unit
- EX21, EX22, EX23: expander of reverse multiresolution transform unit
- GP, GP0, GP1, GP2, GP3: gain processing unit
- H0: band image of resolution level 0
- H0_nr: noise-reduced band image of resolution level 0
- H1: band image of resolution level 1
- H1_nr: noise-reduced band image of resolution level 1
- H2: band image of resolution level 2
- H2_nr: noise-reduced band image of resolution level 2
- L0: non-minified picture (original image)
- L0_nr: in-processing image of resolution level 0
- L1: first minified picture
- L1_nr: in-processing image of resolution level 1
- L2: second minified picture
- L2_nr: in-processing image of resolution level 2
- L3: third minified picture (band image of resolution level 3)
- L3_nr: noise-reduced band image of resolution level 3
- ND11, ND12, ND13, ND14, ND22, ND23, ND24, ND33, ND34, ND44: noise signal
- NR0, NR1, NR2, NR3: noise reducer
- NS1, NS2, NS3: noise selector
- NZ0, NZ1, NZ2, NZ3, NZ10, NZ20, NZ30: noise
- RD1, RD2, RD3: reducer
- SB1, SB2, SB3: subtractor
- ST1 to STn: GPS satellite
- SW0, SW1, SW2, SW3: switch element
- in_img: input image
- out_img: output image

What is claimed is:

1. A noise processing apparatus comprising:
a processor configured to:
- generate a plurality of band images in different resolutions by performing a multiresolution transform process including image size reduction on an original image;
- perform a noise reducing process on at least one of the plurality of band images; and
- generate an output image in the same resolution as the original image by performing a reverse multiresolution transform process including image size expansion and a noise addition process on the at least one of the band images subjected to the noise reducing process, the processor performing the noise addition process in a lower resolution than the original image.

2. The noise processing apparatus according to claim 1, wherein the processor is further configured to perform the noise addition process before the image size expansion in the reverse multiresolution transform process.

3. The noise processing apparatus according to claim 1, wherein the processor is further configured to perform the noise addition process in parallel in two or more resolutions.

4. The noise processing apparatus according to claim 1, wherein the processor is further configured to switch between adding and not adding a noise for each resolution in the noise addition process.

5. The noise processing apparatus according to claim 1, wherein the processor is further configured to adjust an intensity of the noise by multiplying the noise to be added by a gain.

6. The noise processing apparatus according to claim 5, wherein the processor is further configured to adjust the intensity of the noise by multiplying the noise by the gain different for each resolution.

7. The noise processing apparatus according to claim 5, wherein the processor is further configured to determine at least a first brightness region and a second brightness region having a higher brightness than the first brightness region in the original image; and
- set the gain to be different depending on the first brightness region and the second brightness region.

8. The noise processing apparatus according to claim 7, wherein in a case where the original image is a positive image, the processor is further configured to set the gain of the noise to be added to a pixel corresponding to the second brightness region to be smaller than the gain of the noise to be added to a pixel corresponding to the first brightness region, and in a case where the original image is a negative image, the processor is further configured to set the gain of the noise to be added to the pixel corresponding to the second brightness region to be greater than the gain of the noise to be added to the pixel corresponding to the first brightness region.

9. A noise processing method comprising:
generating a plurality of band images in different resolutions by performing a multiresolution transform process including image size reduction on an original image;
performing a noise reducing process on at least one of the plurality of band images; and
generating an output image in the same resolution as the original image by performing a reverse multiresolution transform process including image size expansion and performing a noise addition process in a lower resolution than the original image on the at least one of the plurality of band images subjected to the noise reducing process.

* * * * *